United States Patent [19]

Shamie

[11] Patent Number: 4,715,075
[45] Date of Patent: Dec. 29, 1987

[54] ADJUSTABLE LEGS FOR FOLDING CRIB

[76] Inventor: Louis Shamie, 972 Dean St., Brooklyn, N.Y. 11238

[21] Appl. No.: 10,220

[22] Filed: Feb. 3, 1987

[51] Int. Cl.$^4$ .......................... A47D 7/01; A47D 7/03
[52] U.S. Cl. .......................................... 5/93 R; 5/11; 5/99 R; 248/188.5; 403/108; 403/381
[58] Field of Search ................. 5/11, 93 R, 310, 99 R; 403/108, 381; 248/188.5

[56] References Cited

U.S. PATENT DOCUMENTS

| | | | |
|---|---|---|---|
| 2,574,559 | 11/1951 | Graf et al. | 5/93 R |
| 2,831,739 | 4/1958 | Fryckholm | 248/188.5 |
| 2,889,560 | 6/1959 | Carman | 5/11 |
| 3,670,344 | 6/1972 | Boudreau | 5/93 R |
| 3,894,304 | 7/1975 | Burbidge et al. | 5/93 R |
| 3,896,513 | 7/1975 | Boucher et al. | 5/100 |

FOREIGN PATENT DOCUMENTS 104735  3/1917  United Kingdom ...................... 5/93

Primary Examiner—Alexander Grosz
Attorney, Agent, or Firm—Peter C. Michalos

[57] ABSTRACT

A convertible crib which has a frame with four upright corner posts, includes a leg for each corner post which is vertically movable for adjusting the height of the frame. Each corner post has a plurality of guide elements which are received in a guide channel provided in each of the legs. Bolts extend through holes in the legs and can be threadably engaged with the guide elements for holding the legs at a selected vertical position on the respective post. A plurality of holes are provided along the length of the legs so that the different set of holes can be selected to adjust the vertical height of the frame.

6 Claims, 6 Drawing Figures

4,715,075

ADJUSTABLE LEGS FOR FOLDING CRIB

FIELD AND BACKGROUND OF THE INVENTION

The present invention relates in general to cribs, and in particular to a new and useful foldable and convertible crib which has legs that can be adjusted for height.

Various foldable and non-foldable cribs are known. These cribs generally comprise a frame which has four corner posts and each extend downwardly to form the supporting leg. The vertical position of the frame has generally been set by the length of the legs, and has not been adjustable.

SUMMARY OF THE INVENTION

The present invention is drawn to a foldable or convertible crib which has legs that are made separately of four corner posts and which can be set at different vertical positions with respect to the corner posts to adjust the vertical height of the frame off the floor.

Accordingly an object of the present invention is to provide a crib which has a frame with four upright posts at its four corners and with a leg for each post having a vertically extending guide channel. At least two vertically aligned and vertically spaced guide elements are connected to each of the posts and are receivable in the guide channel of one leg. Holes are provided through the legs at spacings which are equal to the spacing between the guide elements. Bolts can be inserted through two of the holes to threadably engage the guide elements to hold the leg to its post. By providing a plurality of holes through the post, different pairs of holes can be selected to adjust the vertical position of the legs with respect to the posts.

The bolts may also be replaced by pins or bayonet type locking elements that engage with the guide elements to fix the legs in their set vertical position.

A further object of the invention is to provide adjustable legs for a crib which are simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
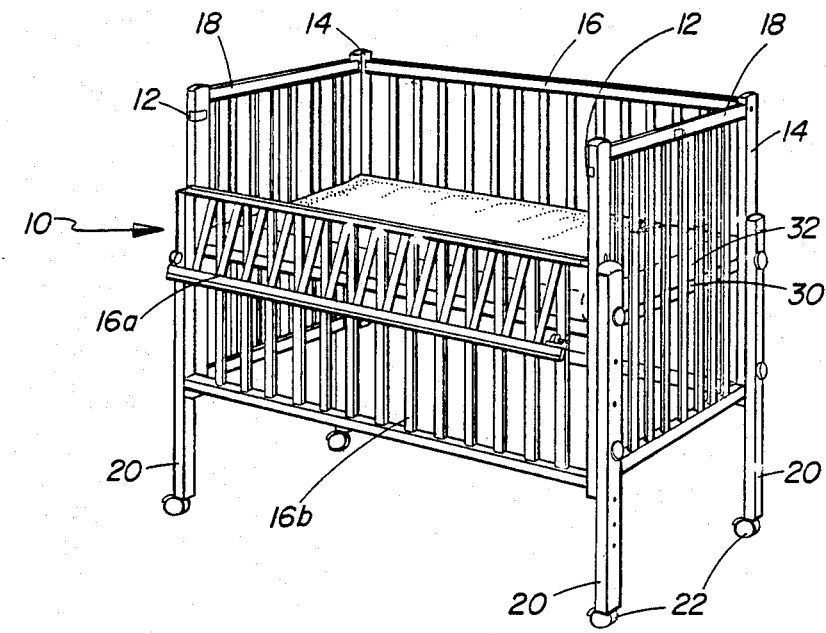
FIG. 1 is a perspective view of a convertible crib with adjustable legs in accordance with the invention.

Referring to the drawings in particular, the invention embodied in FIG. 1 comprises a convertible foldable crib having a frame generally designated 10 which comprises a pair of front upright corner posts 12 and a pair of rear upright corner posts 14. A rear side wall 16 is fixed between corner posts 14 and a front side wall 16b is fixed between front posts 12. A top side gate 16a is hinged to the top of side wall 16b and is shown in its lowered position in FIG. 1. It can be swung upwardly into a vertical position and engaged with locking means (not shown) on the inside surfaces of posts 12, to enclose a space of the frame 10. The lower end of this space is bounded by mattress support 30 which carries a mattress 32. The mattress support 30 is shown in its upper position where it can be used as a dressing table or the like. Its lower position (shown in solid line in FIG. 5) is meant for sleeping or playing.

In accordance with the present invention, a leg 20 is slidably engaged for vertical movement to each of the posts 12 and 14. A roller 22 is connected to the bottom of each of the legs 20.

Figure 2:
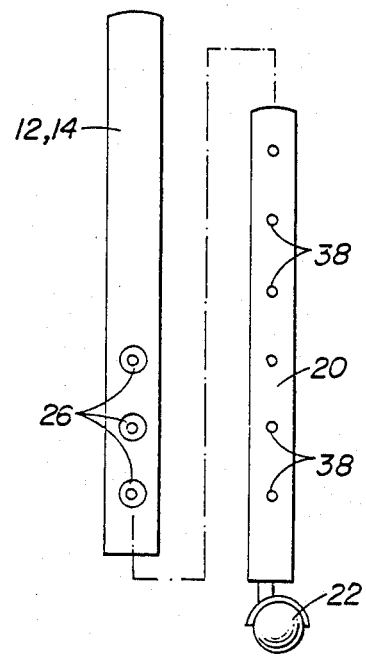
FIG. 2 is an exploded side elevational view of one corner post and its associated leg.

As shown in FIG. 2, at least two guide elements 26 are connected to an inside surface of posts 12,14. Three equally spaced guide elements 26 are used in the illustrated embodiment.

Figure 3:
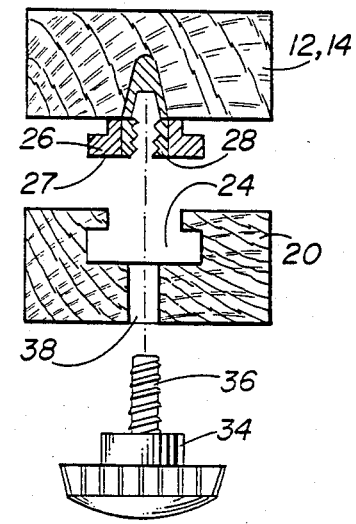
FIG. 3 is a top sectional and exploded view of one post and its associated leg.

As shown in FIG. 3, each of the guide elements 26 comprises an outer button-shaped plastic part 27 having a top large diameter portion and a bottom small diameter portion which is engaged against the inner surface of post 12,14 and an inner threaded stud 28 which is made of metal and seated in the wooden upright 12,14. Button 26 is press-fit or otherwise fixed onto stud 28.

Each of the legs 20 includes a T-shaped vertically extending channel 24 which is shaped to receive the vertically aligned and vertically spaced guide elements 26. Holes 38 are drilled through the legs 20 and communicate with the channels 24. As shown in FIG. 2, a plurality, in this case six, vertically spaced holes 38 are provided. The spacing between the holes 38 is equal to the spacing between guide elements 26.

In this way, a leg 20 can be brought to a selected vertical position with respect to its post 12,14, with three of the holes 38 aligned with three guide elements 26. To fix the leg 20 on its post 12,14, bolt means in the form of a knob 34 with threaded bolt portion 36 are used. Bolt portion 36 are inserted into holes 38 and threaded into the the threaded stud. Knobs 34 facilitate turning of the bolt members 36 and thus tightening of leg 20 against its post. Mating surfaces for the legs and posts may also be provided with the knob 34 squeezing the mating surfaces together to firmly seat the legs against their posts. Two or three knobs 34 can be used to secure each leg to each post.

Figure 4:
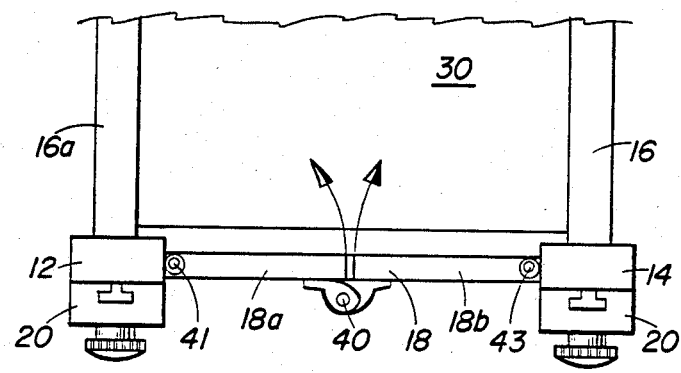
FIG. 4 is a partial top plan view of the crib shown in FIG. 1, illustrating the foldable sides of the crib.

FIG. 4 illustrates one of the end walls 18 which comprises two parts 18a and 18b which are hinged to each other at a hinge 40 for pivoting in the direction of the arrows in FIG. 4. The end wall portions 18a and 18b are also hinged to respective corner posts 12 and 14 by hinges 41 and 43. A lock (not shown) is engageable between end wall portions 18a and 18b to keep them in a coplanar position. When the end wall portions are pivoted in the direction of the arrows, the front and rear side walls can be moved toward each other to fold the crib.

Figure 5:
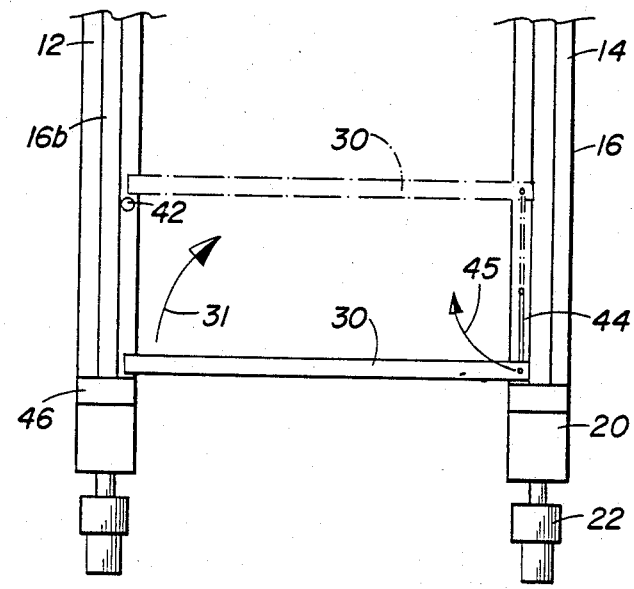
FIG. 5 is a partial end elevational view of the crib of FIG. 1 illustrating the two positions for a mattress suport.
Figure 6:
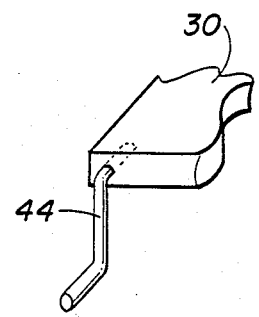
FIG. 6 is a fragmentary perspective view showing a crank lever which is connected between the mattress support and one of the posts for permitting movement of the mattress between its two positions.

FIG. 5 shows the mattress support 30 in its lowered position. For folding the crib, mattress support 30 is pivoted in the direction of arrow 31 until it is upright and parallel to the rear side wall 16. For this purpose, support 30 is pivotally connected to a mattress support crank 44 (see FIG. 6) which has one L-shaped leg portion extending into and pivotally carrying the mattrsss support 30, and another opposite L-shaped leg which extends into and is pivotally connected to one of the rear upright posts 14. The use of crank 44 also facilitates the movement of mattress support 30 from a lower solid line position shown in FIG. 5 to an upper phantom line position. This is achieved by rotating crank 44 in a direction of arrow 45. In its lower position, the front edge of mattress support 30 rests on a lower rail 46 of the front side wall 16b. In its upper position, the front edge of mattress support 30 rests on a pair of mattress support pegs 42 which are connected to the inside surfaces of front posts 12.

While specific embodiments of the invention have been shown and described in detail to illustrate the application of the principles of the invention, it will be understood that the invention may be embodied otherwise without departing from such principles.

What is claimed is:

1. In a crib having a frame with four upright corner posts at the corners thereof, the improvement comprising, a leg for each post, each leg having a vertically extending guide channel therein, at least two vertically aligned and vertically spaced guide elements connected to each post, said guide elements of one post being slidable in the channel of one leg for vertical movement of said one leg with respect to its one post, each leg having a plurality of holes therethrough which are in greater number than the number of guide elements for one post, each hole communicating with said channel, said holes being spaced apart by an amount equal to the vertical spacing of said guide elements on one post, and bolt means engageable through two of said holes and into engagement with said at least two guide elements of one post for fixing a vertical position of each leg on its post.

2. The improvement of claim 1, wherein each post has an outer slide surface, each leg having an inner slide surface, said slide surfaces of said post and leg being slidably engaged with each other, said bolt means urging said slide surfaces together.

3. The improvement of claim 2, wherein each channel has a T-shaped horizontal cross section, each guide element comprising a button having a large diameter flange and a small diameter collar, each guide element including a threaded stud therein having threads, said bolt means comprising a knob having a bolt portion connected therethrough and being threadably engaged with said threads of one stud.

4. The improvement of claim 3, wherein each stud is made of metal and each button is made of plastic.

5. The improvement of claim 1, wherein each channel has a T-shaped horizontal cross section, each guide element comprising a button having a large diameter flange and a small diameter collar, each guide element including a threaded stud therein having threads, said bolt means comprising a knob having a bolt portion connected therethrough and being threadably engaged with said threads of one stud.

6. The improvement of claim 5, wherein each stud is made of metal and each button is made of plastic.

* * * * *